US012555933B2

(12) United States Patent
Brekosky et al.

(10) Patent No.: US 12,555,933 B2
(45) Date of Patent: Feb. 17, 2026

(54) ELECTRICAL CONNECTOR

(71) Applicants: TE Connectivity Solutions GmbH, Schaffhausen (CH); Tyco Electronics UK Ltd, Swindon (GB)

(72) Inventors: Lawrence John Brekosky, Middletown, PA (US); John Marsh, Swindon (GB); Vinayakumar Shettar, Middletown, PA (US); Ramesh S., Bangalore (IN)

(73) Assignees: TE Connectivity Solutions GmbH, Schaffhausen (CH); Tyco Electronics UK Ltd., Swindon (GB)

( * ) Notice: Subject to any disclaimer, the term of this patent is extended or adjusted under 35 U.S.C. 154(b) by 553 days.

(21) Appl. No.: 17/875,573

(22) Filed: Jul. 28, 2022

(65) Prior Publication Data

US 2024/0039187 A1 Feb. 1, 2024

(51) Int. Cl.
*H01R 12/53* (2011.01)

(52) U.S. Cl.
CPC .................................... *H01R 12/53* (2013.01)

(58) Field of Classification Search
CPC ....................................................... H01R 12/53
USPC ............................................................ 439/78
See application file for complete search history.

(56) References Cited

U.S. PATENT DOCUMENTS 3,963,319 A * 6/1976 Schumacher .......... H01R 4/245 439/439
6,089,905 A * 7/2000 Shimmyo .............. H01R 12/79 439/495
6,193,541 B1 * 2/2001 Lee ........................ H01R 12/79 439/358
6,280,217 B1 * 8/2001 Lin ........................ H01R 12/79 439/495
6,752,658 B2 * 6/2004 Jones ................. H01R 13/6585 439/79
7,179,118 B1 * 2/2007 Harlan ................. H01R 12/774 439/495
7,201,604 B1 * 4/2007 Amidon ............. H01R 13/5825 439/418
7,270,566 B1 * 9/2007 Liao ....................... H01R 12/79 439/495
7,278,876 B2 * 10/2007 Hara .................... H01R 13/582 439/449
7,442,064 B2 * 10/2008 Miwa ..................... H01R 43/26 439/341
7,766,680 B2 * 8/2010 Suzuki ................... H01R 12/79 439/495
7,892,002 B2 * 2/2011 Shen ...................... H01R 12/88 439/495

(Continued)

*Primary Examiner* — Harshad C Patel

(57) ABSTRACT

An electrical connector includes a connector housing having a mounting end configured to be mounted to a circuit board and a cable exit end. The connector housing includes contact channels extending between the mounting end and the cable exit end. The connector housing includes a cover closing the contact channels. The electrical connector includes contacts received in the contact channels. Each contact includes a mating end and a cable end. The mating end is mated with the circuit board. The cable end is terminated to a cable. The cable exiting the connector housing at the cable exit end. The cable end is oriented at an angle relative to the mating end. The contact is formed in place in the contact channel.

19 Claims, 12 Drawing Sheets

(56) References Cited

U.S. PATENT DOCUMENTS

| | | | | |
|---|---|---|---|---|
| 7,955,094 | B2 * | 6/2011 | Lu | H01R 13/6477 439/541.5 |
| 8,052,477 | B1 * | 11/2011 | Ko | H01R 27/00 439/660 |
| 8,128,429 | B2 * | 3/2012 | Suzuki | H01R 12/88 439/493 |
| 8,172,592 | B2 * | 5/2012 | Ogura | H01R 12/707 439/260 |
| 8,714,994 | B2 * | 5/2014 | Daily | H01R 24/64 439/344 |
| 8,939,790 | B2 * | 1/2015 | Jung | H01R 12/774 439/495 |
| 9,070,993 | B2 * | 6/2015 | Honda | H01R 13/193 |
| 9,455,513 | B2 * | 9/2016 | Yokoo | H01R 12/88 |
| 11,626,687 | B2 * | 4/2023 | Listing | H01R 13/426 439/382 |
| 2021/0226350 | A1 * | 7/2021 | Feng | H01R 13/405 |
| 2023/0387615 | A1 * | 11/2023 | Yu | H01R 13/6658 |

* cited by examiner

ELECTRICAL CONNECTOR

BACKGROUND OF THE INVENTION

The subject matter herein relates generally to electrical connectors.

Electrical connectors are used to electrically connect components, such as an electrical device with a circuit board. For example, the electrical connector may have cables coupled to the electrical device. The electrical connector is mounted to the circuit board to electrically connect contacts, connected to the cables, to the circuit board. Some electrical connectors are right angle connectors having the cables extending perpendicular to the mating direction with the circuit board. The cables may have right angle bends, within the connector housing, to extend from the connector housing. However, the connector housings are large and bulky to accommodate the bends in the cables, which have a minimum bend radius. Other known electrical connectors have right angle contacts loaded into the connector housing. The contacts are bent at 90° and the cables extend from the contacts. Pre-forming the contacts with the 90° bends requires an additional assembly step and fixturing for forming the contact, which adds complexity and cost to the assembly process.

BRIEF DESCRIPTION OF THE INVENTION

In one embodiment, an electrical connector is provided and includes a connector housing having a mounting end configured to be mounted to a circuit board and a cable exit end. The connector housing includes contact channels extending between the mounting end and the cable exit end. The connector housing includes a cover closing the contact channels. The electrical connector includes contacts received in the contact channels. Each contact includes a mating end and a cable end. The mating end is mated with the circuit board. The cable end is terminated to a cable. The cable exiting the connector housing at the cable exit end. The cable end is oriented at an angle relative to the mating end. The contact is formed in place in the contact channel.

In another embodiment, an electrical connector is provided and includes a connector housing having a mounting end configured to be mounted to a circuit board and a cable exit end. The connector housing includes contact channels extending between the mounting end and the cable exit end. Each contact channel has a mating portion and a cable portion oriented at an angle relative to the mating portion. Each contact channel has a forming anvil between the mating portion and the cable portion. The connector housing includes a cover closing the contact channels. The electrical connector includes contacts received in the contact channels. Each contact includes a mating end and a cable end. The mating end is mated with the circuit board. The mating end received in the mating portion of the contact channel. The cable end is terminated to a cable. The cable end received in the cable portion of the contact channel. The cable exiting the connector housing at the cable exit end. The contact includes a bend between the mating end and the cable end such that the cable end is oriented at an angle relative to the mating end. The contact is formed in place in the contact channel against the forming anvil to form the bend.

In a further embodiment, an electrical connector is provided and includes a connector housing having a top, a bottom, a front, a rear, a first side, and a second side. The connector housing includes a mounting end at the bottom configured to be mounted to a circuit board. The connector housing includes a cable exit end at the rear. The connector housing includes contact channels extending between the mounting end and the cable exit end. The connector housing includes a cover coupled to the top of the connector housing by a living hinge. The cover is movable between an open position and a closed position. The cover closes the contact channels in the closed position. The electrical connector includes contacts received in the contact channels. Each contact includes a mating end and a cable end. The mating end is mated with the circuit board. The cable end is terminated to a cable. The cable exiting the connector housing at the cable exit end. The cable end is oriented at an angle relative to the mating end. The cover holds the contacts in the contact channels.

DETAILED DESCRIPTION OF THE INVENTION

Figure 1:
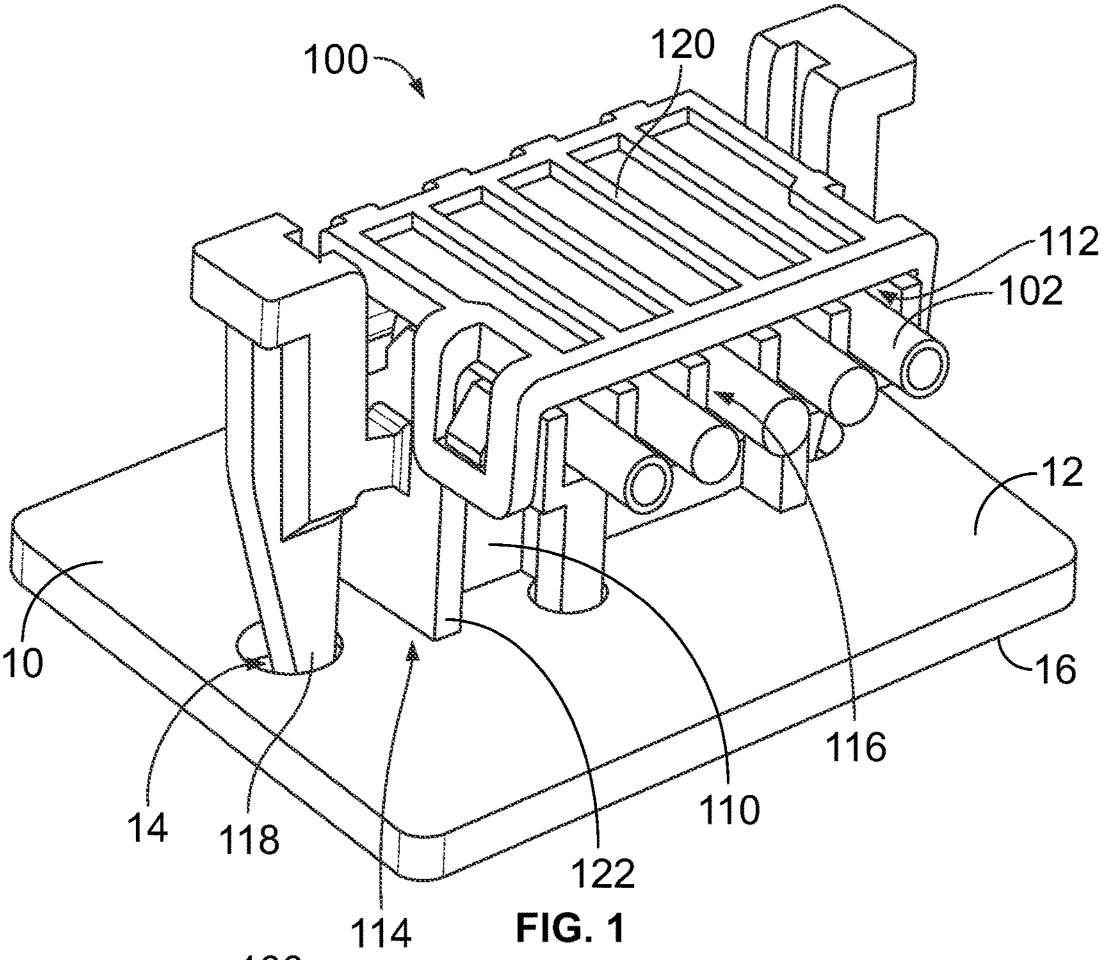
FIG. 1 is a top perspective view of an electrical connector in accordance with an exemplary embodiment.
Figure 2:
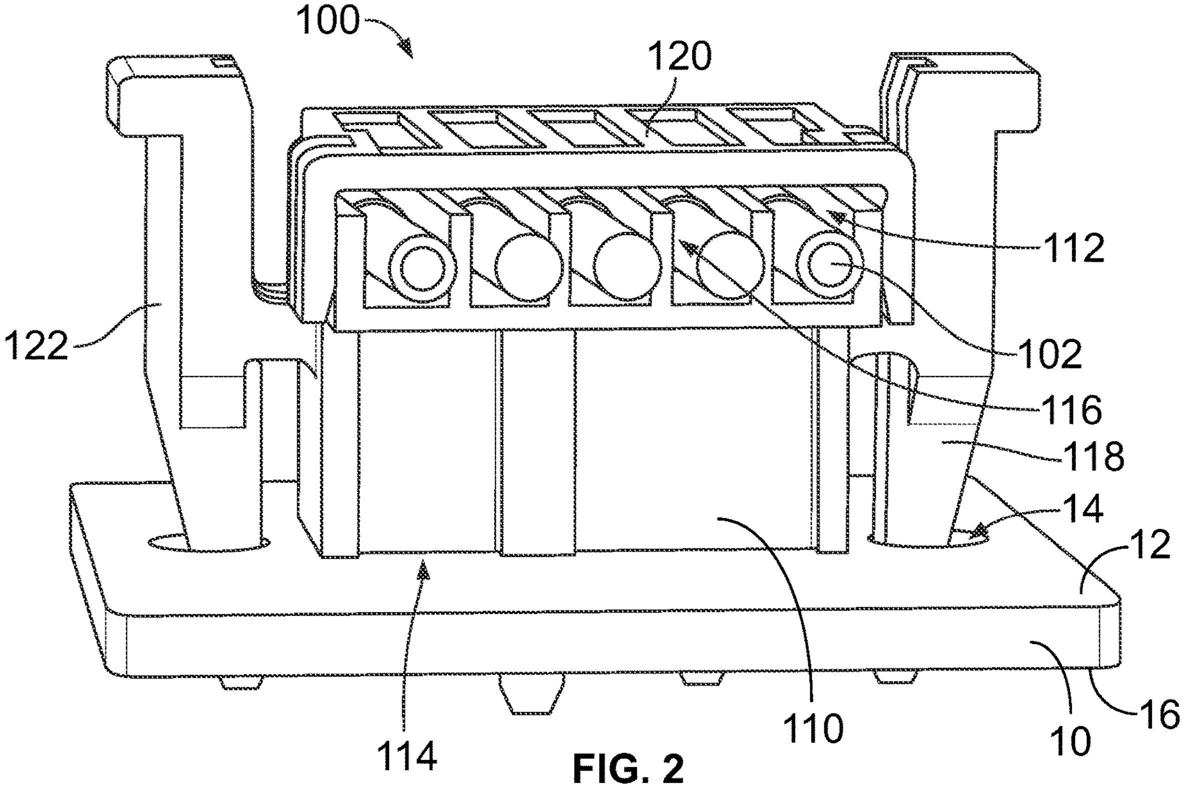
FIG. 2 is an end view of the electrical connector in accordance with an exemplary embodiment.

FIG. 1 is a top perspective view of an electrical connector 100 in accordance with an exemplary embodiment. FIG. 2 is an end view of the electrical connector 100 in accordance with an exemplary embodiment. In an exemplary embodiment, the electrical connector 100 is mounted to a circuit board 10. However, the electrical connector 100 may be mated to a mating electrical connector in alternative embodiments. In an exemplary embodiment, the electrical connector 100 is a cable connector having a plurality of cables 102 extending from the electrical connector 100. In an exemplary embodiment, the electrical connector 100 is a right angle connector having the cables 102 exit the electrical connector 100 at 90°, such as perpendicular to the mating interface with the circuit board 10. The cables 102 may be oriented generally parallel to the circuit board 10. However, in alternative embodiments, the cables 102 may exit at other angles, such as at any angle between 90° and 180°. In other various embodiments, the electrical connector 100 may be a vertical connector having the cables 102 exiting the electrical connector 100 at 180°.

In an exemplary embodiment, the electrical connector 100 includes a connector housing 110 holding a plurality of contacts 200 (shown in FIG. 5) terminated to ends of the corresponding cables 102. The contacts 200 and the cables 102 are received in contact channels 112 extending through the connector housing 110. In an exemplary embodiment, the contact channels 112 extend between a mating end 114 and a cable exit end 116 of the connector housing 110. The cables 102 extend from the cable exit end 116. The mating end 114 is configured to be mated to the circuit board 10, such as to an upper surface 12 of the circuit board 10. In an exemplary embodiment, the cable exit end 116 is oriented perpendicular to the mating end 114; however, other orientations are possible in alternative embodiments.

In an exemplary embodiment, the connector housing 110 includes latches 118 used to secure the electrical connector 100 to the circuit board 10. For example, the latches 118 may be received in openings 14 in the circuit board 10 to latchably secured to a lower surface 16 of the circuit board 10. Other types of securing features may be used in alternative embodiments. For example, the mounting lugs may extend from the connector housing 110, which are configured to be secured to the circuit board 10 using fasteners, such as threaded fasteners.

In an exemplary embodiment, the connector housing 110 includes a cover 120 coupled to the connector housing 110. In various embodiments, the cover 120 is hingedly coupled to the connector housing 110, such as at the living hinges. The cover 120 is configured to be latchably coupled to the connector housing 110 using latches 122. In an exemplary embodiment, the cover 120 is used to position the contacts 200 and/or the cables 102 in the contact channels 112 of the connector housing 110. The cover 120 may prevent removal of the contacts 200 and/or the cables 102 from the contact channels 112. In an exemplary embodiment, the cover 120 is used to insert and press the contacts 200 into the connector housing 110 to secure the contacts 200 to the connector housing 110. For example, the cover 120 may press downward against the contacts 200 when the cover 120 is coupled to the connector housing 110. The cover 120 assists in bending the contacts 200 to a desired angle. In an exemplary embodiment, the cover 120 is used to form the contacts 200 into a right angle contacts as the cover 120 is closed and coupled to the connector housing 110. For example, the cover 120 may form the contacts 200 in place within the connector housing 110 during assembly. The cover 120 may include pressing features or other forming features that engage and press against the contacts 200 to bend the contacts into a desired shape during assembly. The cover 120 secures the contacts 200 in the housing after the cover 120 is latched to the connector housing 110.

Figure 3:
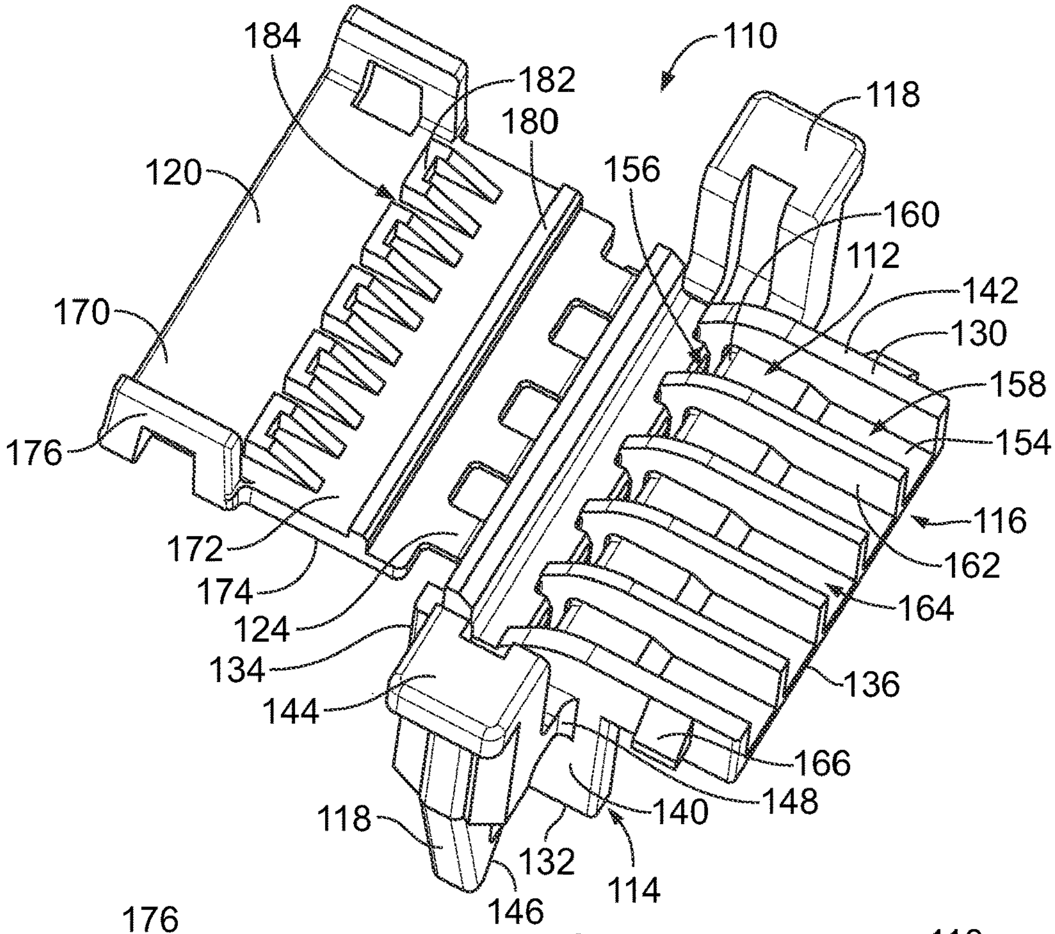
FIG. 3 is a top perspective view of the connector housing in accordance with an exemplary embodiment.
Figure 4:
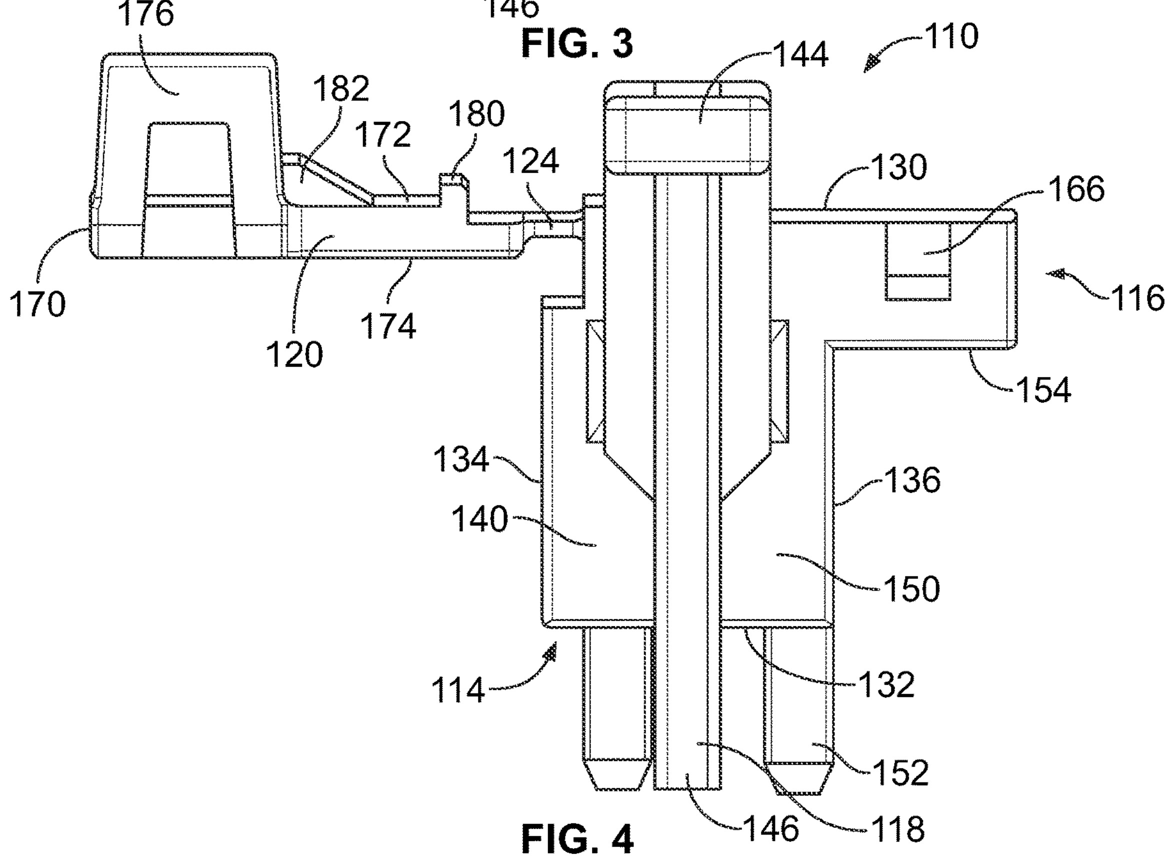
FIG. 4 is a side view of the connector housing in accordance with an exemplary embodiment.

FIG. 3 is a top perspective view of the connector housing 110 in accordance with an exemplary embodiment. FIG. 4 is a side view of the connector housing 110 in accordance with an exemplary embodiment. FIGS. 3 and 4 illustrate the cover 120 in an open position.

The connector housing 110 includes a top 130 and a bottom 132 opposite the top 130. In the illustrated embodiment, the bottom 132 defines the mating end 114 of the connector housing 110. In an exemplary embodiment, the cover 120 is coupled to the connector housing 110 at the top 130, such as using living hinges 124. For example, the cover 120 may be integral with the connector housing 110 as part of a unitary, monolithic structure. For example, the cover 120 may be co-molded with the connector housing 110. The living hinges 124 are formed between the cover 120 and the connector housing 110 during the molding process such that the living hinges 124 are integral with the cover 120 and with the connector housing 110 as part of the unitary, monolithic structure.

The connector housing 110 includes a front 134 and a rear 136 opposite the front 134. In the illustrated embodiment, the rear 136 defines the cable exit end 116. The cover 120 may be coupled to the front 134 of the connector housing 110 through the living hinges 124.

The connector housing 110 includes a first side 140 and a second side 142. The latches 118 are provided at the sides 140, 142. The latches 118 are deflectable relative to the connector housing 110. For example, the latches 118 may include actuators 144 at the top ends of the latches 118. The actuators 144 may be squeezed and pressed inward to release the latches 118. The latches 118 include latching fingers 146 and bottom ends of the latches 118. The latching fingers 146 are used to latchably secure the connector housing 110 to the circuit board 10. The latches 118 are connected to the sides 140, 142 of the connector housing 110 by connecting tabs 148. The connecting tabs 148 may be approximately centered between the actuators 144 and the latching fingers 146. The latches 118 may be pivoted about the connecting tabs 148 when the actuators 144 are pressed to release the latches 118. In an exemplary embodiment, the latches 118 are integral with the connector housing 110 As part of the unitary, monolithic structure. For example, the latches 118 are co-molded with the connector housing 110.

The connector housing 110 includes a base 150. The latches 118 extend from the base 150. The contact channels 112 extend through the base 150. In the illustrated embodiment, the connector housing 110 includes a plurality of the contact channels 112 arranged in a single row between the first side 140 and the second side 142. The contact channels 112 may have other arrangements in alternative embodiments, such as being arranged in multiple rows.

In an exemplary embodiment, the connector housing 110 includes mounting pins 152 extending from the base 150, such as from the bottom 132. The mounting pins 152 are used to locate the connector housing 110 relative to the circuit board 10 when the electrical connector 100 is coupled to the circuit board 10. Other types of locating features may be used in alternative embodiments.

In an exemplary embodiment, the connector housing 110 includes a cable support platform 154 extending from the base 150. The cable support platform 154 is provided at the top 130. The cable support platform 154 extends rearward from the base 150 to the rear 136 of the connector housing 110.

The contact channels 112 extend through the cable support platform 154. In an exemplary embodiment, the contact channels 112 include mating portions 156 extending through the base 150 and cable portions 158 extending through the cable support platform 154. Optionally, the mating portions 156 may extend generally vertically and the cable portions 158 may extend generally horizontally; however, the cable portions 158 may be oriented at other angles relative to the mating portions 156 in alternative embodiments. The cable portions 158 are configured to receive the cables 102 and portions of the contacts 200 (shown in FIG. 5).

In an exemplary embodiment, forming anvils 160 are located between the mating portions 156 and the cable portions 158. The forming anvils 160 are located at the corner defined between the mating portions 156 and the cable portions 158. In an exemplary embodiment, the contacts 200 are formed against the forming anvils 160. For example, the contacts 200 may have 90° bends formed therein by bending the contacts over the forming anvils 160.

In an exemplary embodiment, the separating walls 162 are defined between the contact channels 112. For example, the separating walls 162 may be located between the mating portions 156 and/or between the cable portions 158 and/or between the forming anvils 160. The separating walls 162 isolate the contacts 200 and the cables 102 from other contacts 200 and cables 102.

In an exemplary embodiment, the cable portions 158 of the contact channels 112 include cable pockets 164. The cable pockets 164 may be located at the cable exit and 116. The cable pockets 164 may be deeper (for example, the separating walls 162 along the cable pockets 164 may be taller) than other sections of the cable portions 158. For example, the cable pockets 164 may be deeper to accommodate the cables 102.

The connector housing 110 includes latching features 166 at the first side 140 and the second side 142. The latching features 166 are used to latchably secure the cover 120 to the connector housing 110. In the illustrated embodiment, the latching features 166 are located along the cable support platform 154, such as proximate to the rear 136 of the connector housing 110. The latching features 166 may be latching tabs. In alternative embodiments, the latching features 166 may be deflectable latches. Other types of securing features may be used in alternative embodiments. In an exemplary embodiment, the latching features 166 include ramps at the upper portions of the latching features 166 and catch surfaces at the lower portions of the latching features 166. The latching features 166 may have other shapes in alternative embodiments.

The cover 120 includes a cover plate 170 having an inner surface 172 and an outer surface 174. The cover 120 includes cover latches 176 along the opposite sides of the cover plate 170. The cover latches 176 interface with the latching features 166 to latchably secure the cover 120 to the connector housing 110. In the illustrated embodiment, the cover latches 176 are deflectable latches having openings that receive the latching features 166. Other types of securing features may be used in alternative embodiments.

The cover 120 includes a forming rib 180 extending from the inner surface 172. The forming rib 180 is configured to press against the contacts 200 to form the contacts 200 in the contact channels 112. For example, the forming rib 180 may press against the contacts 200 and bend the contacts around the forming anvils 160 as the cover 120 is moved from the open position to the closed position. The forming rib 180 may press against the contacts 200 to hold the contacts 200 in the contact channels 112, such as when the cover latches 176 are coupled to the latching features 166. The forming rib 180 may be at least partially received in the contact channels 112 when the cover 120 is closed. In the illustrated embodiment, the forming rib 180 is a continuous rib extending between the opposite sides of the cover plate 170. However, in alternative embodiments, the cover 120 may include discrete forming ribs 180 that are separated by gaps and configured to be received in corresponding contact channels 112, such as between the separating walls 162.

In an exemplary embodiment, the cover 120 includes locating tabs 182 extending from the inner surface and 72. The locating tabs 182 are configured to be received in corresponding contact channels 112. For example, the locating tabs 182 may be received in the cable portions 158 of the contact channels 112. The locating tabs 182 are configured to engage the contacts 200 and/or the cables 102 to position the contacts 200 and/or the cables 102 in the contact channels 112. The locating tabs 182 assist in forming the contacts 200 as the cover 120 is closed. The locating tabs 182 may press the contacts 200 and/or the cables 102 into the cable support platform 154 to position the cables 102 and/or the contacts 200 within the connector housing 110. The locating tabs 182 are sized and shaped to interface with corresponding parts of the contacts 200 and/or the cables 102. In the illustrated embodiment, the locating tabs 182 are separated by gaps 184. The gaps 184 are aligned with and configured to receive the corresponding separating walls 162 when the cover 120 is closed.

Figure 5:
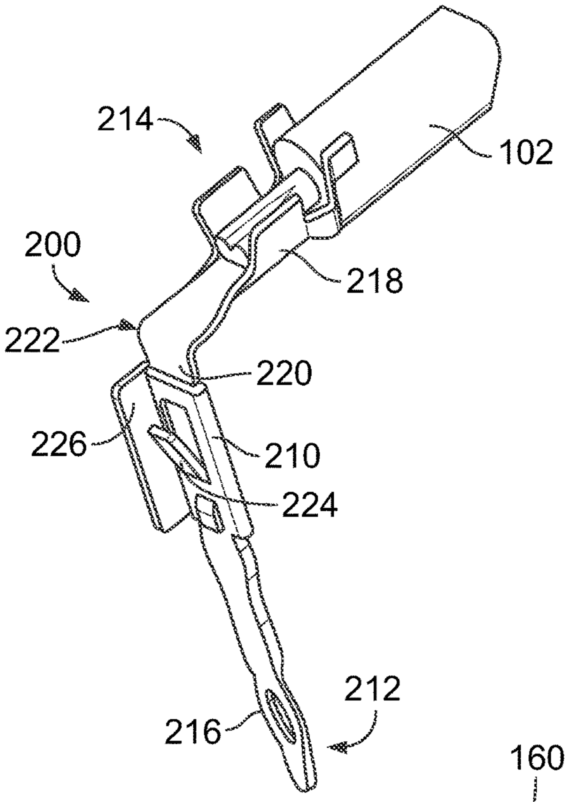
FIG. 5 is a perspective view of one of the contacts and the cables in accordance with an exemplary embodiment.

FIG. 5 is a perspective view of one of the contacts 200 and the cables 102 in accordance with an exemplary embodiment. In the illustrated embodiment, the contact 200 is a right angle contact having a 90° bend in the contact 200. A portion of the contact 200 extends vertically and another portion of the contact 200 extend horizontally. The cable 102 extend horizontally from the contact 200. In alternative embodiments, the contact 200 may have a non-right angle bend. For example, the contact may have a different bend (for example, a bend between 90° and 180°).

In an exemplary embodiment, the contact 200 is a stamped and formed contact. The contact 200 is a single piece contact. Optionally, a plurality of the contacts 200 may be stamped from a common metal sheet and held together on a carrier strip for termination to the cables 102 and for assembly into the connector housing 110. The contact 200 includes a main body 210 extending between a mating end 212 and a cable end 214. In an exemplary embodiment, the contact 200 includes a compliant pin 216 at the mating end 212. The compliant pin 216 is configured to be mated with the circuit board 10. For example, the compliant pin 216 may be press-fit into a plated via of the circuit board 10. Other types of mating portions may be provided at the mating ends 212 in alternative embodiments, such as a solder tail, a spring beam, a socket, or other type of mating portion. In an exemplary embodiment, the contact includes a crimp barrel 218 at the cable end 214. The crimp barrel 218 is configured to be crimped to the end of the cable 102. Other types of cable terminations may be provided at the cable end 214 in alternative embodiments, such as a weld pad, an insulation displacement feature, or other type of termination.

In an exemplary embodiment, the main body 210 includes a transition plate 220 used to transition between the mating end 212 and the cable end 214. The transition plate 220 includes a bend 222 that transitions the cable end 214 at an angle relative to the mating end 212. In an exemplary embodiment, the bend 222 is formed in place within the connector housing 110. For example, the bend 222 is formed by folding over the top portion of the contact 200 against the forming anvil 160 of the connector housing 110. For example, the cover 120 may press against the top portion of the main body 210 to form (for example, bend) the main body 210 over the forming anvil 160 to form the bend 222. In the illustrated embodiment, the bend 222 is a 90° bend to orient the cable end 214 perpendicular to the mating end 212. For example, the mating ends 212 may be oriented vertically and the cable end 214 may be oriented horizontally. The bend 222 may be a different angle in alternative embodiments, such as an angle between 90° and 180° to orient the cable end 214 at other angles relative to the mating end 212. The angle of the bend 222 determines the cable exit angle relative to the mating end 212, and thus relative to the circuit board 10.

In an exemplary embodiment, the main body 210 includes a retention feature 224 used to retain the contact 200 in the connector housing 110. In the illustrated embodiment, the retention feature 224 is a bar or lance stamped and formed out of the main body 210. The bar extends forward in the illustrated embodiment. Other types of retention features may be used in alternative embodiments, such as arms along the side edges of the main body 210 used to dig into the plastic of the connector housing 110 to retain the contact 200 in the connector housing 110.

In an exemplary embodiment, the main body 210 includes a locating feature 226 used to locate the contact 200 and the connector housing 110. In the illustrated embodiment, the locating feature 226 is a bent out of plane relative to the main body 210. For example, the tab may be bent forward relative to the main body 210. The tab is configured be received in the contact channel 112 of the connector housing 110 to locate the contact 200 in the contact channel 112. The tab may hold the bottom portion of the contact 200 within the connector housing 110 in a fixed position relative to the connector housing 110 during the forming of the bend 222 within the connector housing 110.

Figure 6:
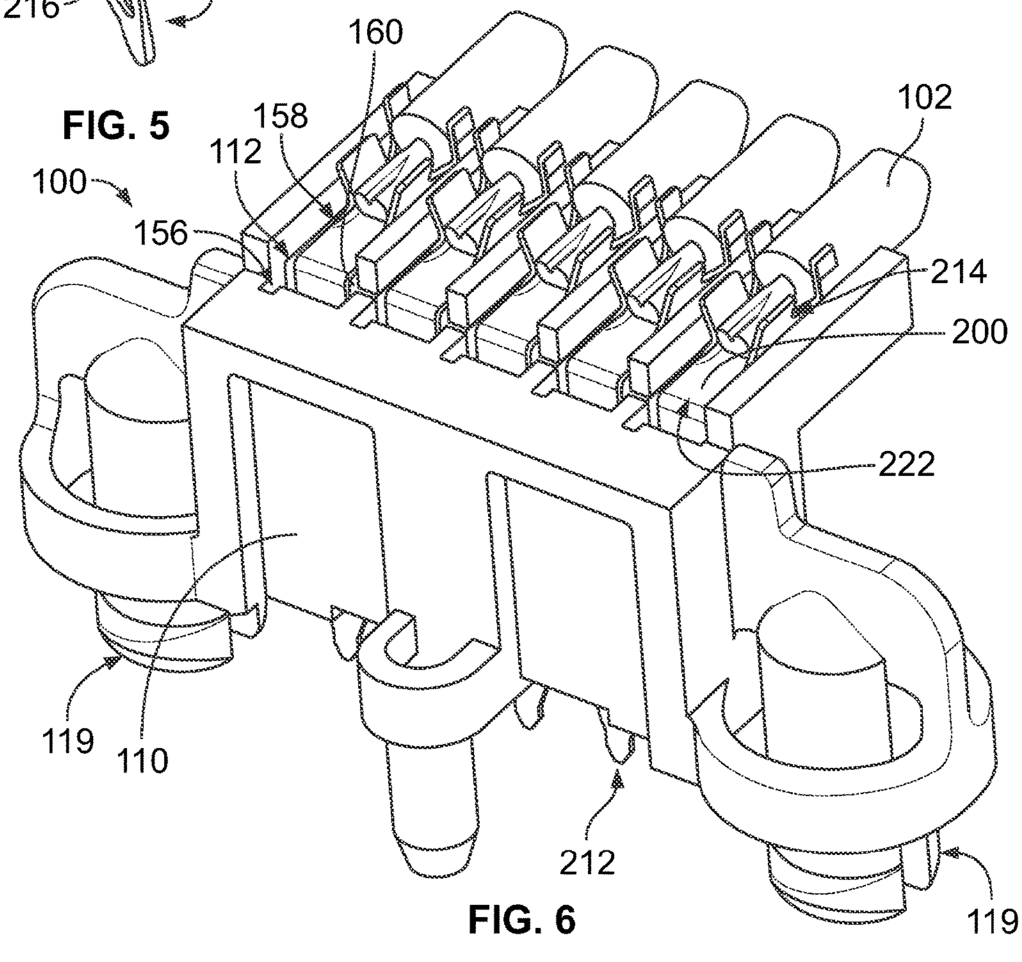
FIG. 6 is a front perspective view of a portion of the electrical connector in accordance with an exemplary embodiment with the cover removed to illustrate the contacts in the connector housing.

FIG. 6 is a front perspective view of a portion of the electrical connector 100 in accordance with an exemplary embodiment with the cover 120 removed to illustrate the contacts 200 in the connector housing 110. FIG. 6 illustrates the connector housing 110 using a different type of securing feature for securing the connector housing 110 to the circuit board 10. In the illustrated embodiment, the securing features include snap pins 119 configured to be snap coupled to the circuit board 10, such as by pressing the snap pins 119 through the openings 14 in the circuit board 110.

The contacts 200 and the cables 102 are received in the corresponding contact channels 112 of the connector housing 110. The mating ends 212 of the contacts 200 are received in the mating portions 156 of the contact channels 112. The cable ends 214 of the contacts 200 and the cables 102 are received in the cable portions 158 of the contact channels 112. In an exemplary embodiment, the contacts 200 are formed in place within the connector housing 110. For example, the bends 222 are formed against the forming anvils 160 after the mating ends 212 are received in the mating portions 156 of the contact channels 112. In an exemplary embodiment, the cover 120 (not shown) is used to hold the top portions of the contacts 200 over the forming anvils 160 to create the bends 222 as the cover 120 as being coupled to the connector housing 110 (for example, as the cover 120 is being closed).

Figure 7:
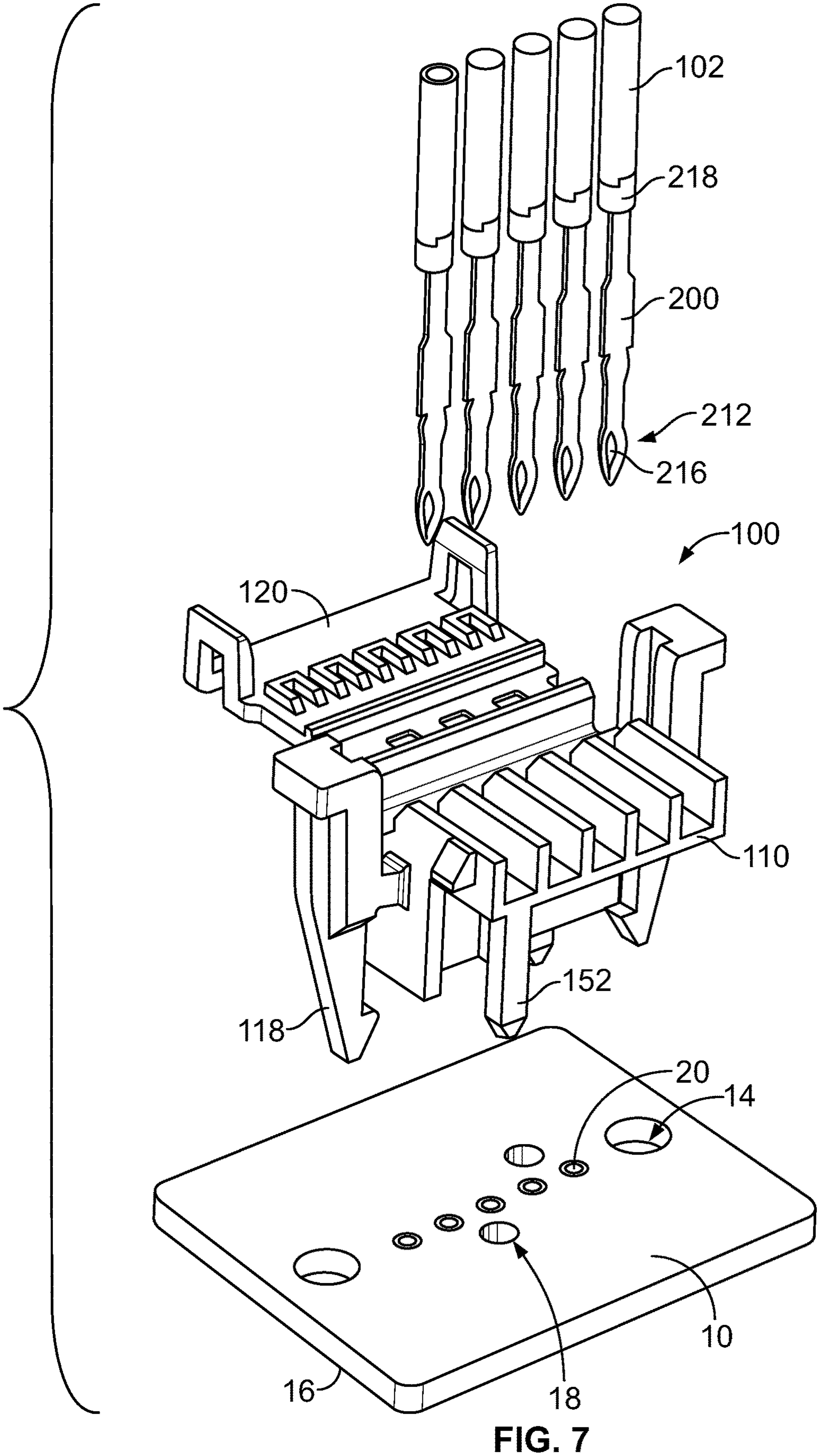
FIG. 7 is an exploded perspective view of the electrical connector in accordance with an exemplary embodiment showing the contacts poised for loading into the connector housing and showing the connector housing poised for coupling to the circuit board.
Figure 8:
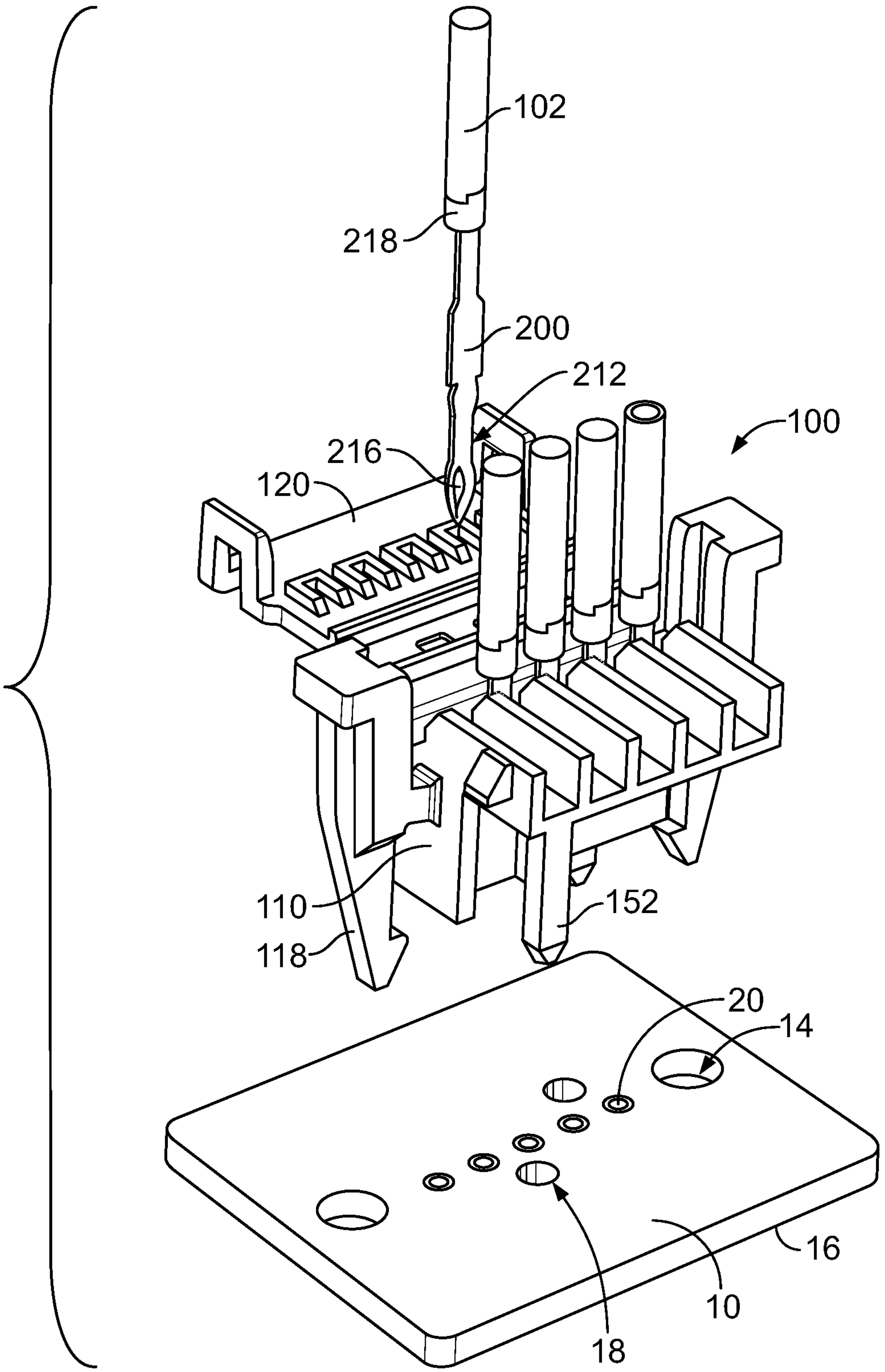
FIG. 8 is an exploded perspective view of the electrical connector in accordance with an exemplary embodiment showing a plurality of the contacts loaded into the connector housing and showing one of the contacts poised for loading into the connector housing.

FIG. 7 is an exploded perspective view of the electrical connector 100 in accordance with an exemplary embodiment showing the contacts 200 poised for loading into the connector housing 110 and showing the connector housing 110 poised for coupling to the circuit board 10. FIG. 8 is an exploded perspective view of the electrical connector 100 in accordance with an exemplary embodiment showing a plurality of the contacts 200 loaded into the connector housing 110 and showing one of the contacts 200 poised for loading into the connector housing 110.

During assembly, the contacts 200 are coupled to the cables 102. For example, the crimp barrels 218 of the contacts 200 are crimped to the ends of the cables 102. The contacts 200 are in a straight configuration during assembly. For example, the contacts 200 do not include the right angle bend prior to loading the contacts 200 into the connector housing 110. As such, the contacts 200 do not require fixturing and/or a separate bending process to form the right angle bend prior to assembly with the connector housing 110. In contrast, the cover 120 of the connector housing 110 is used to form the 90° bend in the contacts 200 after the contacts 200 are loaded into the connector housing 110. The simple assembly step of closing the cover 120 simultaneously accomplishes forming of the 90° bend in the contacts 200.

After the contacts 200 are loaded into the connector housing 110, the connector housing 110 may be mounted to the circuit board 10. For example, the mounting pins 152 may be aligned with guide openings 18 in the circuit board 10. The mounting pins 152 align the latches 118 with the openings 14. The mounting pins 152 align the compliant pins 216 at the mating ends 212 of the contacts 200 with board conductors 20 of the circuit board 10. In the illustrated embodiment, the board conductors are plated vias configured to receive the compliant pins 216. Other types of board conductors may be used in alternative embodiments, such as solder pads or other types of circuit traces. The connector housing 110 is pressed downward onto the circuit board 10 to electrically connect the contacts 200 with the circuit board 10 and to mechanically connect the connector housing 110 to the circuit board 10. For example, the latches 118 may latchably coupled to the lower surface 16 of the circuit board 10 when the latching finger's 146 pass through the openings 14 to interface with the lower surface 16.

In various embodiments, the connector housing 110 is coupled to the circuit board 10 prior to closing the cover 120 and forming the bends in the contacts 200. However, in other various embodiments, the connector housing 110 is coupled to the circuit board 10 after the cover 120 is closed and the contacts 200 are formed.

Figure 9:
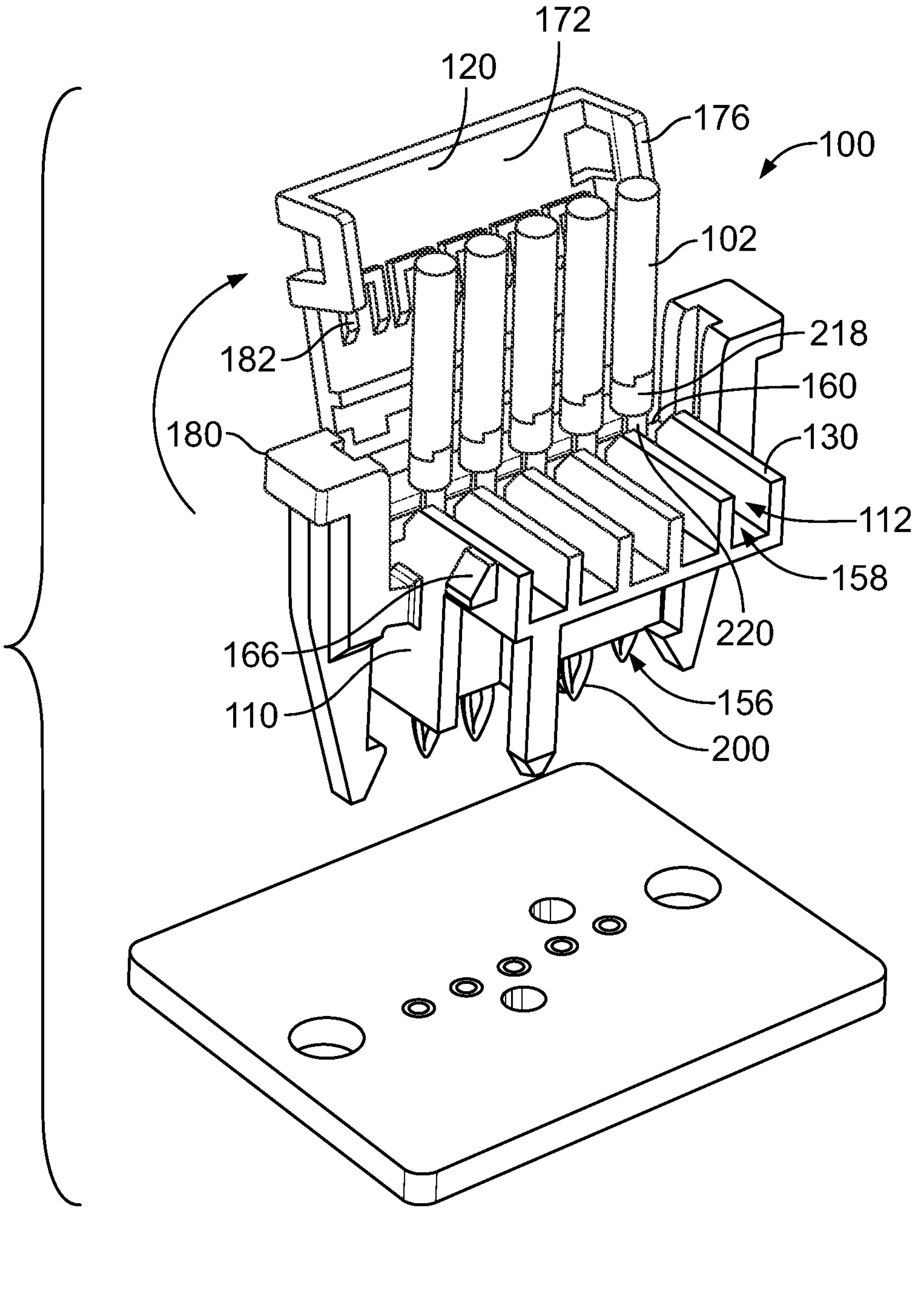
FIG. 9 is a rear perspective view of the electrical connector in accordance with an exemplary embodiment showing the cover partially closed prior to the cover engaging the contacts and the cables.
Figure 10:
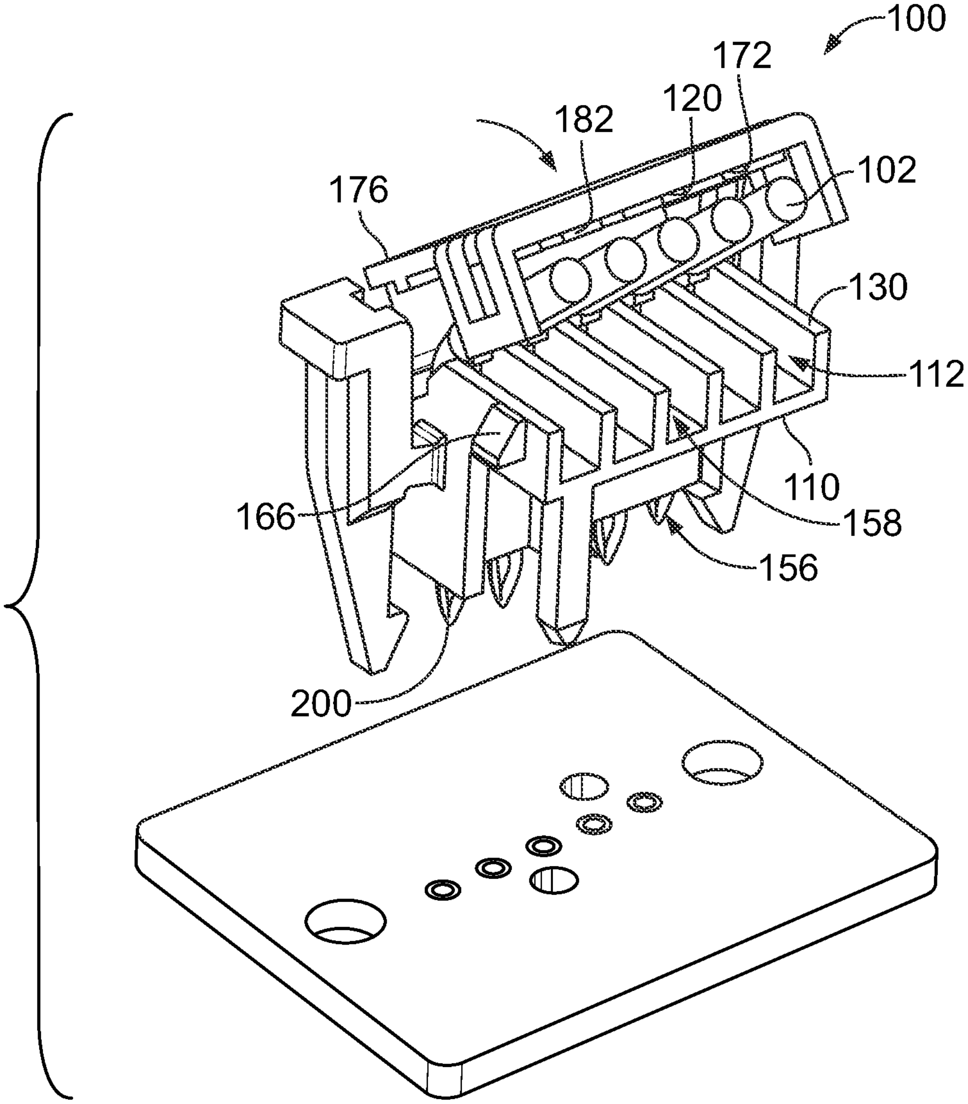
FIG. 10 is a rear perspective view of the electrical connector in accordance with an exemplary embodiment showing the cover partially closed and engaging the contacts and the cables.
Figure 11:
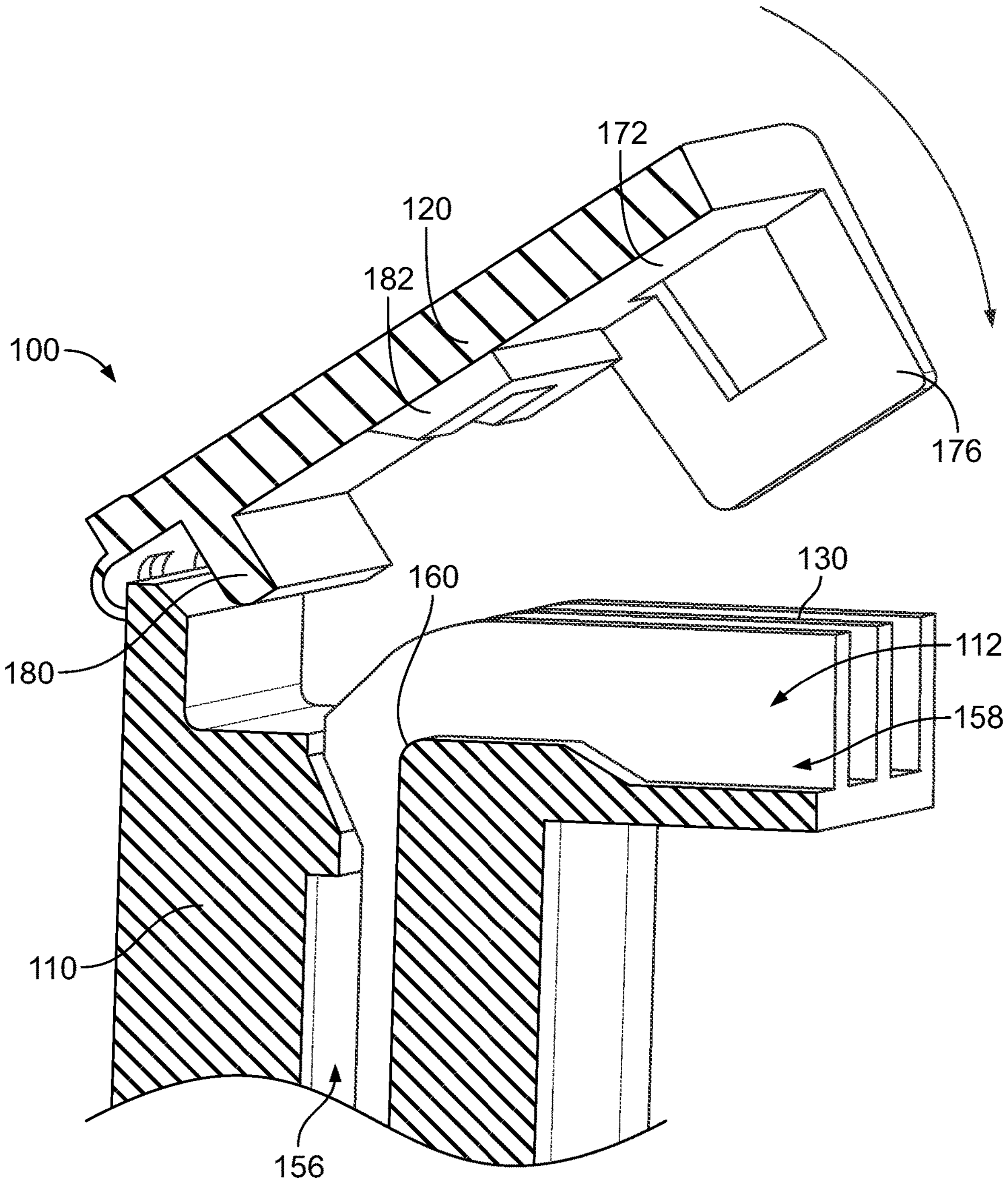
FIG. 11 is a partial sectional view of a portion of the electrical connector showing the cover partially closed.

FIG. 9 is a rear perspective view of the electrical connector 100 in accordance with an exemplary embodiment showing the cover 120 partially closed prior to the cover 120 engaging the contacts 200 and the cables 102. FIG. 10 is a rear perspective view of the electrical connector 100 in accordance with an exemplary embodiment showing the cover 120 partially closed and engaging the contacts 200 and the cables 102. FIG. 11 is a partial sectional view of a portion of the electrical connector 100 showing the cover 120 partially closed. The contacts 200 are removed in FIG. 11 to illustrate the connector housing 110.

During assembly, as the cover 120 is moved from the open position to the closed position, the inner surface 172 of the cover 120 engages the contacts 200 and the cables 102 to press the contacts 200 and the cables 102 into the contact channels 112. The transition plates 220 of the contacts 200 are bent around the forming anvils 160 of the connector housing 110. The lower portions of the contacts 200 are held firmly in the mating portions 156 of the contact channels 112 while the bends 222 (shown in FIG. 5) are formed in the transition plates 220 of the contacts 200. The cover 120 forces the upper portions of the contacts 200 and the cables 102 into the cable portions 158 of the contact channels 112. For example, the forming rib 180 engages the upper portions of the contacts 200 and fold the upper portions over the forming anvils 160. The forming rib 180 presses the contacts 200 into the cable portions 158 of the contact channels 112. The locating tabs 182 engage the crimp barrels 218 and/or the ends of the cables 102 to press the crimp barrels 218 and the ends of the cables 102 into the cable portions 158 of the contact channels 112. The cover 120 is closed against the top 130 of the connector housing 110 to stuff the cables 102 and the upper portions of the contacts 200 into the cable portions 158 of the contact channels 112. The cover latches 176 are latchably coupled to the latching features 166 of the connector housing 110 to secure the cover 120 to the connector housing 110.

Figure 12:
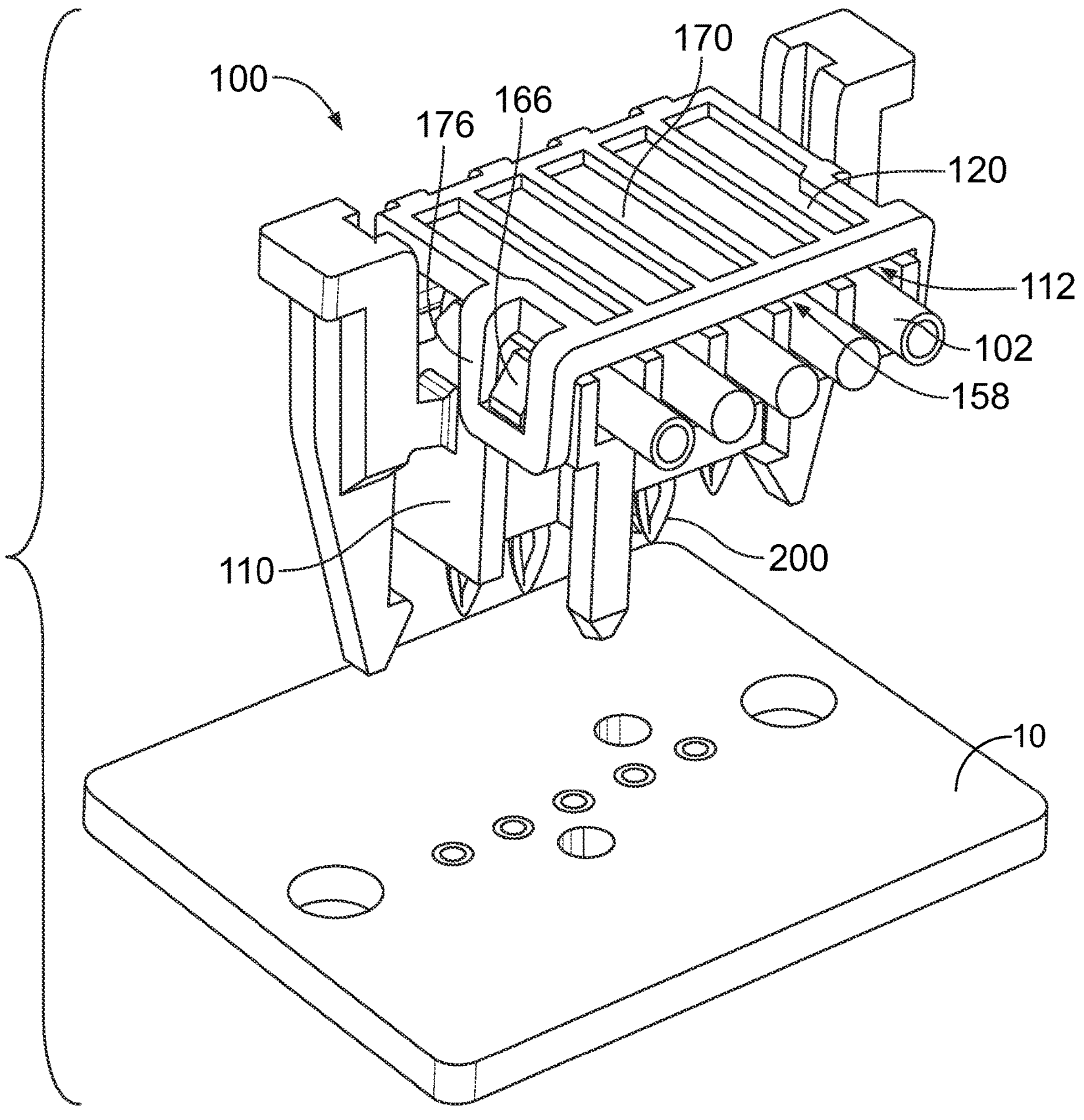
FIG. 12 is a rear perspective view of the electrical connector in accordance with an exemplary embodiment showing the cover in a closed position relative to the connector housing.

FIG. 12 is a rear perspective view of the electrical connector 100 in accordance with an exemplary embodiment showing the cover 120 in a closed position relative to the connector housing 110. The cover latches 176 are latchably coupled to the latching features 166 of the connector housing 110. The cover plate 170 of the cover 120 holds the cables 102 and the cable ends 214 of the contacts 200 in the cable portions 158 of the contact channels 112. In an exemplary embodiment, the cables 102 may exit the connector housing 110 in a cable exit direction that is perpendicular to the mating direction of the electrical connector 100 with the circuit board 10. For example, the cables 102 may be oriented horizontally, which is perpendicular relative to the vertical mating direction. However, in alternative embodiments, the cable portions 158 of the contact channels 112 may be oriented at a different angle other than a right angle, such as at any angle between 90° and 180°. In an exemplary embodiment, the connector housing 110 is coupled to the circuit board 10 after the cover 120 is closed and the contacts 200 are formed.

Figure 13:
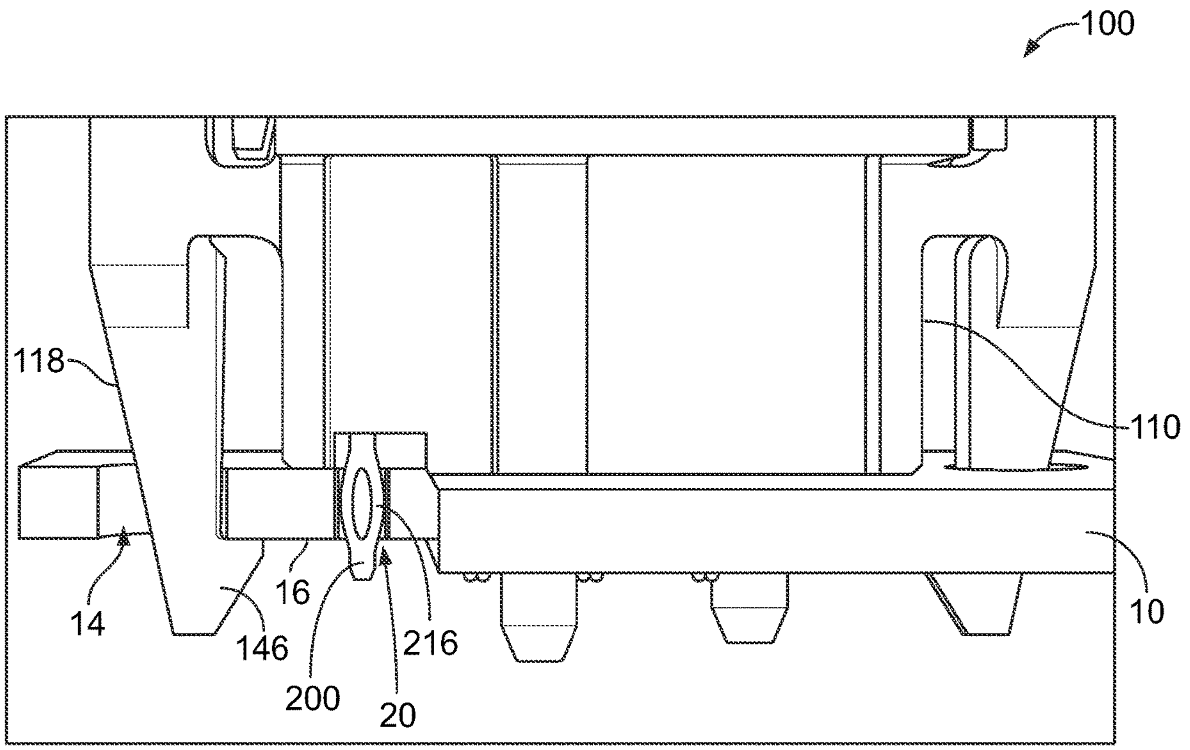
FIG. 13 is a partial sectional view of the electrical connector mounted to the circuit board in accordance with an exemplary embodiment.

FIG. 13 is a partial sectional view of the electrical connector 100 mounted to the circuit board 10. FIG. 12 shows the latch 118 latchably coupled to the lower surface 16 of the circuit board 10. The latching finger 146 extends through the opening 14 to interface with the lower surface 16 and secure the connector housing 110 to the circuit board 10. FIG. 12 shows the compliant pin 216 of one of the contacts 200 the press-fit into the corresponding board conductor 20 (for example, the plated via).

Figure 14:
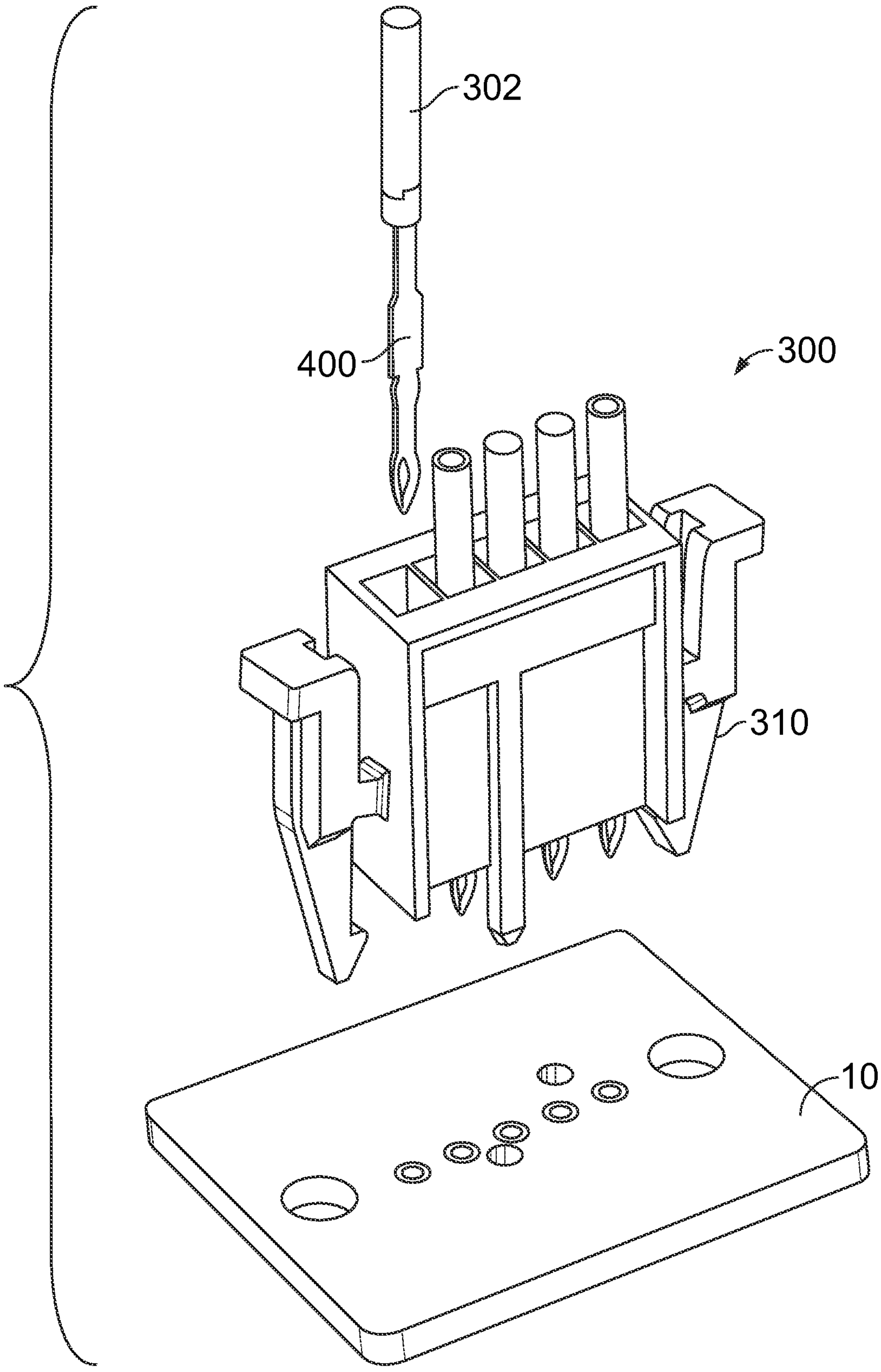
FIG. 14 is an exploded perspective view of an electrical connector in accordance with an exemplary embodiment showing contacts poised for loading into a connector housing of the electrical connector.
Figure 15:
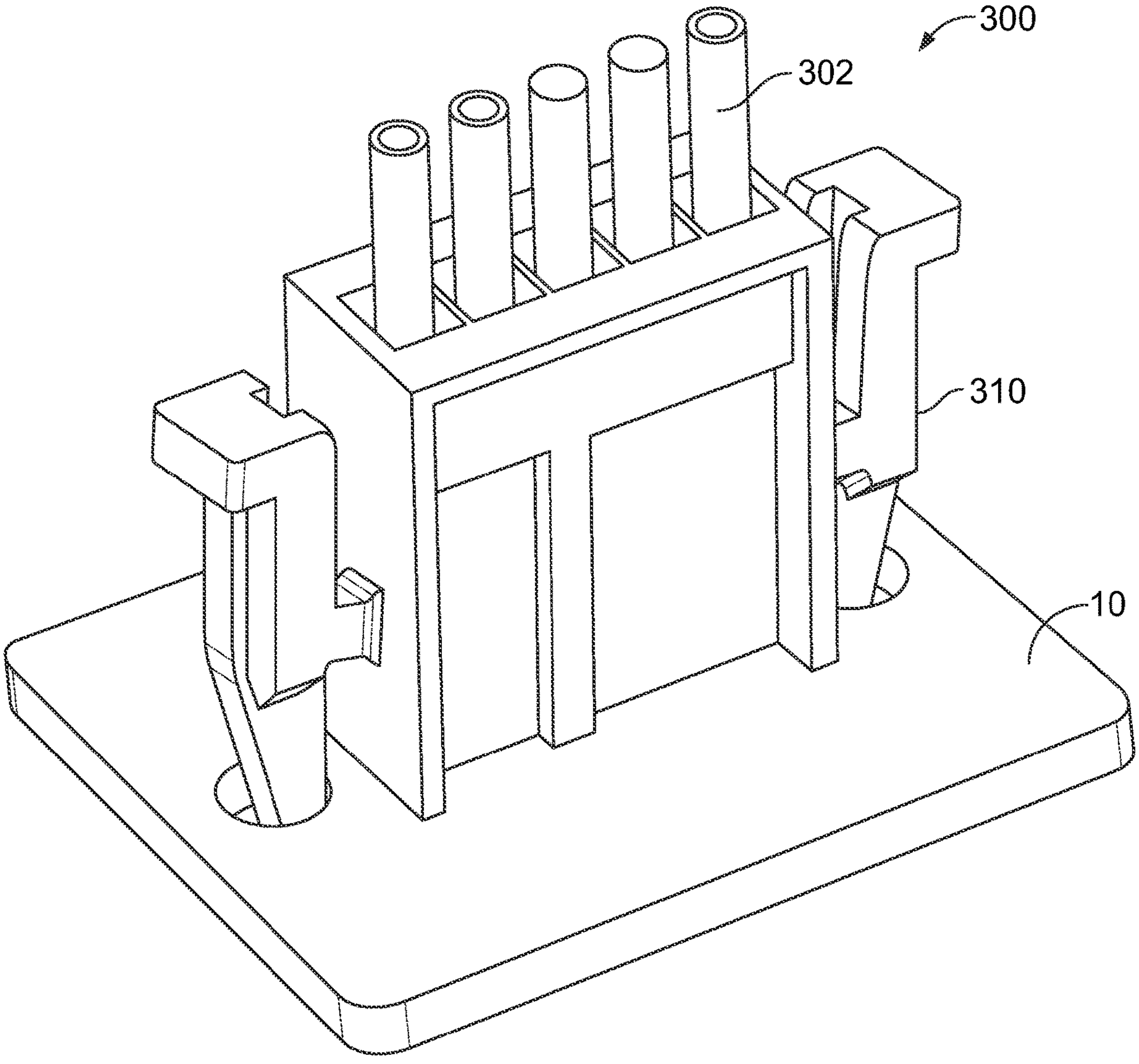
FIG. 15 is a rear perspective view of the electrical connector in accordance with an exemplary embodiment showing the electrical connector coupled to the circuit board.

FIG. 14 is an exploded perspective view of an electrical connector 300 in accordance with an exemplary embodiment showing contacts 400 poised for loading into a connector housing 310 of the electrical connector 300 with the electrical connector 300 poised for coupling to the circuit board 10. FIG. 15 is a rear perspective view of the electrical connector 300 in accordance with an exemplary embodiment showing the electrical connector 300 coupled to the circuit board 10.

The electrical connector 300 is similar to the electrical connector 100; however, the electrical connector 300 is a vertical connector having the contacts 400 pass straight through the connector housing 310. The cables 302 are oriented perpendicular to the circuit board 10. The cables 302 extend from the connector housing 310 in a direction parallel to the mating direction with the circuit board 10. In an exemplary embodiment, the contacts 400 are identical to the contacts 200; however, the contacts 400 are not bent into a right angle contacts during assembly. Rather, the contacts 400 remain unbent before during and after assembly with the connector housing 310 and the circuit board 10. The connector housing 310 is different to accommodate the straight contacts 400 however, the same contacts may be utilized in both the electrical connector 300 and the electrical connector 100 without the need for separate tooling for manufacture of the contacts 400, 200.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a connector housing having a mounting end configured to be mounted to a circuit board and a cable exit end, the connector housing including contact channels extending between the mounting end and the cable exit end, the connector housing including a cover closing the contact channels;

contacts received in the contact channels, each contact including a mating end and a cable end, the mating end being mated with the circuit board, the cable end being terminated to a cable, the cable exiting the connector housing at the cable exit end, the cable end being oriented at an angle relative to the mating end, wherein the contact is formed in place in the contact channel to change an angular orientation of the cable end relative to the mating end by greater than 45°;

wherein the cover includes locating tabs at an interior surface of the cover, the locating tabs engaging the contacts to bend the contacts against the connector housing during closing of the cover.

2. The electrical connector of claim 1, wherein the contacts are bent from a straight configuration to a 90° configuration in the housing to form right angle contacts.

3. The electrical connector of claim 1, wherein the contacts are formed in place by the cover as the cover is coupled to the connector housing.

4. The electrical connector of claim 1, wherein the cover is rotatably coupled to the connector housing, the cover being movable between an open position and a closed position, the cover directly engaging the contacts and bending the contacts as the cover is moved to the closed position.

5. The electrical connector of claim 4, wherein the cover is coupled to the connector housing by a living hinge.

6. The electrical connector of claim 4, wherein the cover includes a forming rib, the forming rib engaging the contacts and pressing against the contacts to move the cable ends relative to the mating ends as the cover is moved to the closed position.

7. The electrical connector of claim 4, wherein each contact cavity includes a forming anvil, the cover bending the contact around the corresponding forming anvil as the cover is moved to the closed position.

8. The electrical connector of claim 1, wherein each contact cavity includes a forming anvil, the contact being bent against the corresponding forming anvil to orient the cable end relative to the mating end.

9. The electrical connector of claim 8, wherein the cover includes a forming rib engaging the contact adjacent the forming anvil to bend the contact at the forming anvil.

10. The electrical connector of claim 1, wherein each contact channel includes a mating portion and a cable portion oriented at an angle relative to the mating portion, the mating end of the contact being received in the corresponding mating portion, the cable end of the contact being received in the corresponding cable portion, each contact including a bend between the mating end and the cable end to transition between the mating portion and the cable portion of the corresponding contact channel.

11. The electrical connector of claim 1, wherein the connector housing includes a top, a bottom, a front, rear, a first side, and a second side, the mounting end provided at the bottom, the cable exit end provided at the rear, the cover coupled to the top.

12. The electrical connector of claim 1, wherein each contact includes a main body between the mating end and the cable end, the main body including a transition plate, the transition plate including a bend formed against the connector housing.

13. The electrical connector of claim 1, wherein each contact includes a crimp barrel at the cable end, the crimp barrel being crimped to the cable, the connector housing including cable pockets at the cable exit end that receives the corresponding crimp barrel and the corresponding cable.

14. The electrical connector of claim 13, wherein the cover includes locating tabs at an interior surface of the cover, the locating tabs engaging the crimp barrels and forcing the crimp barrels into the corresponding cable pockets when the cover is closed.

15. An electrical connector comprising:

a connector housing having a mounting end configured to be mounted to a circuit board and a cable exit end, the connector housing including contact channels extending between the mounting end and the cable exit end, each contact channel having a mating portion and a cable portion oriented at an angle relative to the mating portion, each contact channel having a forming anvil between the mating portion and the cable portion, the connector housing including a cover closing the contact channels;

contacts received in the contact channels, each contact including a mating end and a cable end, the mating end being mated with the circuit board, the mating end received in the mating portion of the contact channel, the cable end being terminated to a cable, the cable end received in the cable portion of the contact channel, the cable exiting the connector housing at the cable exit end, the contact including a bend between the mating end and the cable end such that the cable end is oriented at an angle relative to the mating end, wherein the contact is formed in place in the contact channel against the forming anvil to form the bend to change an angular orientation of the cable end relative to the mating end at the bend;

wherein the cover includes a forming rib, the forming rib engaging the contacts adjacent the forming anvil and pressing against the contacts to move the cable ends relative to the mating ends as the cover is coupled to the connector housing.

16. The electrical connector of claim 15, wherein the cover is rotatably coupled to the connector housing, the cover being movable between an open position and a closed position, the cover engaging the contacts and bending the contacts as the cover is moved to the closed position.

17. The electrical connector of claim 15, wherein the cover includes locating tabs at an interior surface of the cover, the locating tabs engaging the contacts to bend the contacts against the connector housing during closing of the cover.

18. An electrical connector comprising:

a connector housing having a top, a bottom, a front, a rear, a first side, and a second side, the connector housing including a mounting end at the bottom configured to be mounted to a circuit board, the connector housing including a cable exit end at the rear, the connector housing including contact channels extending between the mounting end and the cable exit end, the connector housing including a cover coupled to the top of the connector housing by a living hinge, the cover movable between an open position and a closed position, the cover closing the contact channels in the closed position;

contacts received in the contact channels, each contact including a mating end and a cable end, the mating end being mated with the circuit board, the cable end being terminated to a cable, the cable exiting the connector housing at the cable exit end, the cable end being oriented at an angle relative to the mating end, the contact being formed in place in the contact channel to change an angular orientation of the cable end relative to the mating end by greater than 45°, wherein the cover holds the contacts in the contact channels;

wherein each contact cavity includes a forming anvil, the cover bending the contact around the corresponding forming anvil as the cover is moved to the closed position.

19. The electrical connector of claim 18, wherein the cover includes locating tabs at an interior surface of the cover, the locating tabs engaging the contacts to bend the contacts against the connector housing during closing of the cover.

* * * * *